United States Patent Office 3,758,507
Patented Sept. 11, 1973

3,758,507
1,2 - EPOXYMETHANO-A-NORSTEROID COMPOUNDS AND PROCESS FOR PREPARATION THEREOF
Masaru Ogata, Kobe-shi, Japan, assignor to Shionogi and Company, Ltd., Osaka, Japan
No Drawing. Continuation-in-part of abandoned application Ser. No. 583,054, Sept. 29, 1966. This application Dec. 30, 1969, Ser. No. 889,288
Claims priority, application Japan, Sept. 29, 1965, 40/59,897
Int. Cl. C07d 3/00
U.S. Cl. 260—333         11 Claims

ABSTRACT OF THE DISCLOSURE 1,2-epoxymethano-A-norsteroid compounds containing 17 to 26 carbon atoms in the steroid nucleus and being optionally substituted at C–7 with methyl, C–9 with fluorine, C–11 with oxo or hydroxy, C–16 with methyl, hydroxy or esters or ethers thereof, C–17 with oxo or C–17α with lower alkyl, lower alkenyl, lower alkynyl, lower alkoxy, hydroxy or esters or ethers thereof, C–17β with hydroxy, esters or ethers thereof, acetyl, hydroxyacetyl, or conventional side chains or cholic acid or cholestane compounds, having hormonic activity, are prepared from the corresponding 2-lower hydrocarbonsulfonyloxymethyl- or halomethyl-A-norsteroid having a 1-hydroxy or ester substituent under basic conditions.

This application is a continuation-in-part application of Ser. No. 583,054, filed Sept. 29, 1966, now abandoned.
The present invention relates to novel steroid derivatives having a unique structure, and more particularly to A-norsteroid oxetane compounds represented by the general partial formula

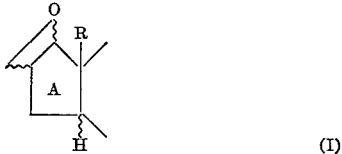

wherein R is a hydrogen atom or methyl group and the configurations at $C_1$, $C_2$ and $C_5$ are the same, i.e. α or β. This invention also provides a process for preparation of these compounds by treating a corresponding A-norsteroid compound having the partial formula

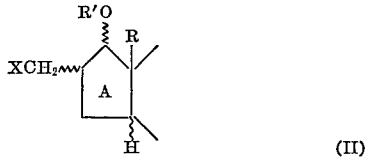

wherein R and the configurations at $C_1$, $C_2$ and $C_5$ are as defined above, R' is a hydrogen atom or lower hydrocarbon carboxylic acyl or lower alkoxy-carboxylic acyl group containing up to eight carbon atoms and X is a lower hydrocarbon sulfonyloxy group containing up to seven carbon atoms or a halogen atom having an atomic weight of from 30 to 130, under basic conditions, in which the base used as oxetane forming agent is selected from among organic and inorganic bases of various basisities, such as alumina, alkali bicarbonate, alkali carbonate, alkaline earth metal hydroxide, alkali hydroxide, an organic quarternary hydroxide or ammonium hydroxide. As to the lower hydrocarbon carboxylic acyl group containing up to eight carbon atoms in the definition of R', these are exemplified by formyl, acetyl, monochloroacetyl, propionyl, benzoyl, butyryl, toluoyl, 1-nitrobenzoyl, p-bromobenzoyl, methoxycarbonyl, ethoxycarbonyl, butoxycarbonyl, and the like. As to the lower hydrocarbon sulfonyloxy group containing up to seven carbon atoms or a halogen atom having an atomic weight of from 30 to 130, a substituent which leaves intermediary carbonium ions in the presence of a base in the subject reaction, represented by X, these are exemplified by a lower alkanesulfonyloxy group containing up to seven carbon atoms, e.g. methanesulfonyloxy, ethanesulfonyloxy, or propanesulfonyloxy, a lower aralkanesulfonyloxy group, e.g. phenylmethanesulfonyloxy, a lower alkyl halogen or nitro-substituted or unsubstituted benzenesulfonyl group, e.g. benzenesulfonyloxy or p-toluenesulfonyloxy, and the like, or a halogen atom having an atomic weight of from 30 to 130, i.e. chlorine, bromine, iodine.

As the starting material, any A-norsteroid compound, especially of the estrane, androstane, pregnane, cholane, cholestane, spirostane, stigmastane or cardanolide series, can equally be utilized to the extent it contains the partial formula represented by the above Formula II, wherein R, R' and X are as defined above. On the other rings and side chains of the starting material, any substituents or unsaturations such as a hydroxyl group, acyloxy group, ether linkage, active or inactive double bond, oxo group, acetal or ketal group, alkyl group, carboxyl group, alkoxycarbonyl group, nitrile group, primary, secondary or tertiary amino group or amido group, halogen atom, alkylthio group and acylthio group may be present, especially at the positions selected from 6, 7, 8, 9, 11, 12, 14, 15, 16, 17, 18, 19, 20, 21, 22, 23, 24, 25, 26, 27, 28, 29, etc., so long as they do not interfere with the subject reaction in the present process. These substituents or double bonds may simultaneously be changed or not in the subject reaction course, and alternatively they can be protected by conventional methods to prevent such simultaneous change.

As typical examples of the starting materials, the following are illustrative:

2β-p-toluenesulfonyloxymethyl - A - nor-5β,25D-spirostan-1β-ol, its acetate, propionate, formate, ethoxycarbonate, benzoate and chloroacetate, 2β-methanesulfonyloxymethyl-A-nor-5β,25D-spirostan - 1β - ol, its acetate, ethoxycarbonate and formate, 2β-benzenesulfonyloxymethyl-A-nor-5β,25D-spirostan - 1β - ol, 2β-chloromethyl-A-nor-5β,25D-spirostan-1β-ol, its acetate, formate ethoxycarbonate and benzoate, 2β-bromomethyl- and 2β-iodomethyl-A-nor-5β,25D-spirostan-1β-ol and their acetate, formate, methoxycarbonate, chloroacetate, benzoate and p-nitrobenzoate, 2α - methanesulfonyloxymethyl- and 2α-p-toluenesulfonyloxymethyl - 17α - methyl-A-nor-5α-androstane-1α,17β-diol and their 1-acetate, formate and ethoxycarbonate, 2β-p-toluenesulfonyloxymethyl - 1β-hydroxy-A-nor-5β-pregn-16-en-20-one, 2β-methanesulfonyloxymethyl-1β-acetyloxy-A-nor-5β-pregnan-20-one, 2β-p-toluenesulfonyloxymethyl-1β,17α-dihydroxy - A - nor-5β-pregnan-20-one, 2α-p-toluenesulfonyloxymethyl - A - nor-5α-estrane-1α,17β-diol, its 17-acetate and p-bromobenzoate, 2α - benzenesulfonyloxymethyl-7α,17α-dimethyl-A-nor-5α-estrane-1α,17β-diol, 2β - p - toluenesulfonyloxymethyl-1β-hydroxy-A-nor-5β-cholanic acid and its methyl ester, 2α-p-toluenesulfonyloxymethyl-A-nor-5α-cholestan-1α-ol, 2α-p-toluenesulfonyloxymethyl - A - nor - 5α-androstane-1α, 17β-diol, its 17-acetate, benzoate, phenylpropionate, methyl ether and tetrahydropyranyl ether, 2β-methanesulfonyloxymethyl - A - nor - 5β-androstane-1β,17β-diol and its 17-acetate, 2α-ethanesulfonyloxymethyl-1α-hydroxy - 17,17 - difluoro-A-nor-5α-androstan-11-one, 2α - phenylmethanesulfonyloxymethyl-1α-acetyloxy-A-nor-5α-androstan-17-one and its 17-ethylene ketal, 2β-chloromethyl - 1β - acetyloxy-A-nor-5β-androstan-17-one and its 17-ethylene ketal, 2β-p-toluenesulfonyloxymethyl-1β-hydroxy-A-nor-5β-androstan - 17 - one and its ethylene ketal, 2α-bromomethyl-1α-ethoxycarbonyloxy-17α-ethyl-A-nor-5α-androstan - 17β - ol, 2α-p-toluenesulfonyloxymethyl - 9α - fluoro-A-nor-5α-androstane-1α,11β,17β-triol and its 1α,17β-diacetate, 2α-iodomethyl-7α-methyl-A-nor-5α-androstane-1α,17β-diol, its 1,17 diacetate and diundecylenate, 2α-p-toluenesulfonyloxymethyl-7α,17α - dimethyl - A - nor - 5α - androstane-1α,17β-diol, 2α-methanesulfonyloxymethyl-7α-methyl - 17β - diol, 2α-ethynyl-A-nor-5α-androstane - 1α,17β - diol, 2α-propanesulfonyloxymethyl-7α-methyl-1α,17β - dihydroxy - A - nor - 5α-androstane - 17α - carbonitrile, 2α-benzenesulfonyloxymethyl-A-nor-5α-pregnane-1α,20β-diol and its 20-tetrahydropyranyl ether, 2α-chloromethyl-1α-acetyloxy-A-nor-5α - pregnane-20-one, 2β-p-toluenesulfonyloxymethyl-1β-hydroxy-A-nor-5β-pregnane-11,20-dione and its 20-ethylene ketal, 2β-methanesulfonyloxymethyl-20,20-ethylenedioxy-A-nor - 5β - pregn-9(11)-en-1β-ol, 2α-benzenesulfonyloxymethyl-1α,17α-dihydroxy - A - nor-5α-pregnan-20-one and its 17-acetate, 2α-p-toluenesulfonyloxymethyl-1α,17α,21-trihydroxy-A-nor-5α-pregnane-11,20-dione, its 21-acetate, trimethylacetate, tert.-butylacetate and enanthate, 2β-methanesulfonyloxymethyl - 1β,17α,21 - trihydroxy-A-nor-5β-pregnane-11,20-dione and its 17,20;20,21-bismethylene ketal, 2β-p-toluenesulfonyloxymethyl-17,20; 20,21 - bismethylenedioxy - A - nor-5β-pregnane-1β,11α-diol, 2α-p-toluenesulfonyloxymethyl - 1α,17α-dihydroxy-21-acetyloxy-A-nor-5α-pregn-8-ene-11,20 - dione, 2α-benzenesulfonyloxymethyl - 16α - methyl - 1α,17α,21-trihydroxy-A-nor-5α-pregnane-11,20-dione and its 21-acetate, 2α-p-toluenesulfonyloxymethyl - 9α - fluoro-1α,11β,16α,17α,21-pentahydroxy-A-nor-5α-pregnan - 20 - one and its 21-acetate, and 2α-p-toluenesulfonyloxymethyl-1α,16α,17α,21 - tetrahydroxy-A-nor-5α-pregnane - 11,20 - dione 16,21-diacetate and 16,17-acetonide. These starting materials are represented by the generic formula

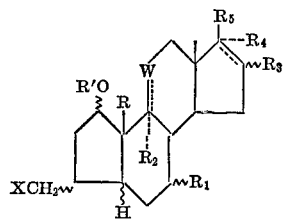

wherein R is a hydrogen atom or methyl group, $R_1$ is a hydrogen atom or lower alkyl group, $R_2$ is a hydrogen atom or halogen atom, $R_3$ is a hydrogen atom, lower alkyl group or R'O— group, $R_4$ is a hydrogen atom, fluorine atom, lower alkyl group, lower alkenyl group, lower alkynyl group, lower alkoxy group, cyano group or R'O— group, $R_5$ is a fluorine atom, lower alkoxy group, R'O— group or $R_6CH_2$—Y— group, R' is a hydrogen atom, lower hydrocarbon carboxylic or lower alkoxy-carboxylic acyl group, W is a group selected from $CH_2$, CHOH and CO, X is a lower hydrocarbon sulfonyloxy group containing up to seven carbon atoms or a halogen atom having an atomic weight of 30–130, and configurations at $C_1$, $C_2$ and $C_5$ are the same, provided that $R_6$ is a hydrogen atom or R'O— group and Y is a group selected from among $CH_2$, CHOR', CO, CZ (wherein R' is defined as above and Z is lower alkylenedioxy group or di-lower alkoxy groups), $(CH_3)_2CH$—$(CH_2)_3$—CH and R'OOC—$(CH_2)_2$—CH (wherein R' is as defined above), and when combined together $R_3$ and $R_4$ represent an acetonide group, $R_3$ and $R_5$ represent a spirostan side chain or $R_4$ and $R_5$ represent an oxo group, lower alkylenedioxy group or the group

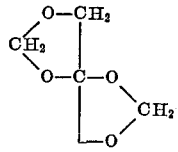

The above-mentioned starting materials can be prepared from the corresponding 5α- or 5β-Δ¹-3-oxo steroids according to the following reaction scheme, illustrated with partial formulae:

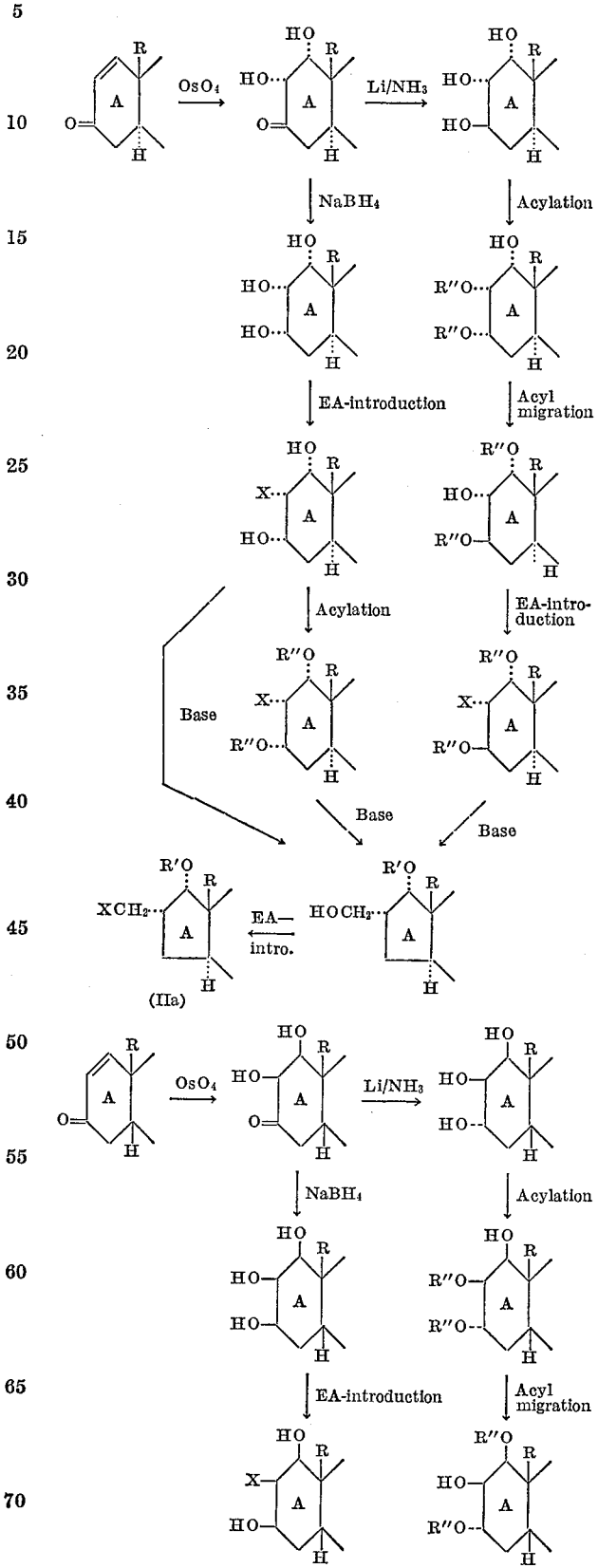

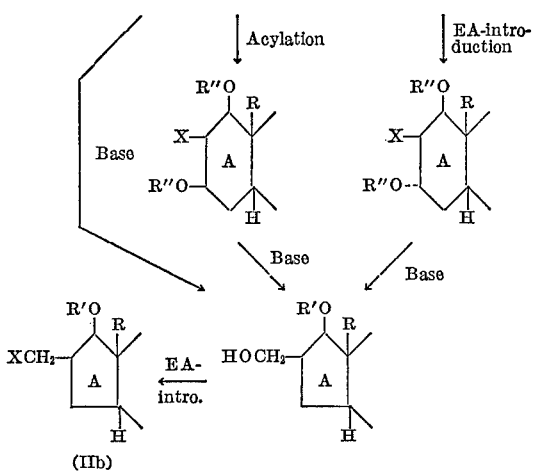

(IIb)

wherein R, R' and X each have the same meaning as defined above, R" represents an acyl group, acylation is carried out by the conventional procedure using a corresponding conventional acylation agent such as acyl anhydride or halide, EA-introduction means the introduction of a lower hydrocarbon-sulfonyloxy group or halogen atom (as defined for X) and is carried out by the conventional procedure using a corresponding conventional sulfonylating agent such as methanesulfonyl halide, p-toluenesulfonyl halide or halogenating agent such as hydrohalogenic acid, phosphorous halogenide, etc., acyl migration is carried out by contact with a catalyst such as alumina and A-ring contraction with base is carried out by the same procedure as used in the present process.

The reaction of the process of the present invention generally proceeds very easily under mild conditions. Thus, the process can be carried out over a wide range of reaction temperatures from −5° C. to the reflux temperature of the solvent utilized, and more conveniently at about room temperature, with or without stirring. For the reaction medium, any aqueous organic solvent can be applied, so long as it does not affect the reaction conditions. A typical solvent is a water-miscible organic solvent selected from an alkanol, a ketone, tetrahydrofuran, dioxane or mixtures thereof. The reaction can usually be accomplished within about 30 minutes to 48 hours, generally within about 5 hours. The reaction product can be isolated by conventional procedures.

The compounds of the present invention are especially represented by the generic formula

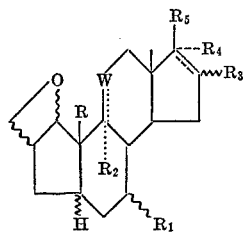

wherein R, $R_1$, $R_2$, $R_3$, $R_4$, $R_5$, W and the configurations at $C_1$, $C_2$ and $C_5$ are as defined above, and more specifically illustrated as: 1β,2β-epoxymethano-A-nor-5β, 25D-spirostan, 17α-methyl-1α,2α-epoxymethano-A-nor-5α-androstan-17β-ol, 1β,2β-epoxymethano - A - nor - 5β-pregn-16-en-20-one, 1β,2β - epoxymethano-A-nor-5β-pregnan-20-one, 17α-hydroxy-1β,2β-epoxymethano - A - nor-5β-pregnan-20-one, 1α,2α - epoxymethano - A - nor - 5α-estran-17β-ol, 7α,17α-dimethyl - A - nor-5α-estran-17β-ol, 1β,2β-epoxymethano - A - nor - 5β - cholanic acid, 1α,2α-epoxymethano-A-nor-5α-cholestane, 1α,2α-epoxymethano-A-nor-5α-androstan-17β-ol, its 17-acetate, benzoate, phenylpropionate, methyl ether and tetrahydropyranyl ether, 1β,2β-epoxymethano-A-nor-5β-androstan-17β-ol and its 17-acetate, 17,17-difluoro-1α,2α-epoxymethano-A-nor-5α-androstan-11-one, 1α,2α-epoxymethano - A - nor-5α-androstan-17-one and its 17-ethylene ketal, 1β,2β-epoxymethano-A-nor-5β-androstan-17one and its 17-ethylene ketal, 17α-ethyl-1α,2α-epoxymethano - A - nor-5α-androstan-17β-ol, 1α,2α-epoxymethano-9α-fluoro - A - nor-5α-androstane-11β,17β-diol and its 17-acetate, 7α-methyl-1α,2α-epoxymethano - A - nor-5α-androstan-17β-ol, its 17-acetate and undecylenate, 7α,17α-dimethyl-1α,2α-epoxymethano-A-nor-5α-androstan - 17β - ol, 7α - methyl-17α-ethynyl-1α,2α-epoxymethano - A - nor-5α-androstan-17β-ol, 7α-methyl - 17β - hydroxy-1α,2α-epoxymethano-A-nor-5α-androstane-17α-carbonitrile, 1α,2α-epoxymethano - A-nor-5α-pregnan-20β-ol and its 20-tetrahydropyranyl ether, 1α,2α-epoxymethano - A - nor-5α-pregnan-20-one, 1β,2β-epoxymethanol-A-nor-5β-pregnane-11,20-dione and its 20-ethylene ketal, 1β,2β-epoxymethano-17,17-ethylenedioxy-A-nor-5β-pregn-9(11)-ene, 1α,2α - epoxymethano - 17α-acetyloxy - A - nor-5α-pregnan-20-one, 17α,21-dihydroxy-1α,2α - epoxymethano-A-nor-5α-pregnane-11,20-dione, its 21-acetate, trimethylacetate, tert.-butylacetate and enanthate, 17α,21 - dihydroxy-1β,2β-epoxymethano - A - nor-5β-pregnane-11,20-dione and its 17,20;20,21-bismethylene ketal, 11α,17α,21-trihydroxy-1β,2β-epoxymethano-A-nor-5β-pregnan-20-one and its 17,20;20,21-bismethylene ketal, 17α,21-dihydroxy-1α,2α-epoxymethano - A-nor-5α-pregn-8-ene-11,20-dione and its 21-acetate, 16α-methyl-17α,21-dihydroxy-1α,2α-epoxymethano - A - nor-5α-pregnane-11, 20-dione and its 21-acetate, 9α-fluoro-11β,16α,17α,21-tetrahydroxy-1α,2α-epoxymethano - A - nor - 5α-pregnan-20-one and 21-acetate, and 16α,17α,21-trihydroxy-1α,2α-epoxymethano - A - nor-5α-pregnane-11,20-dione 16,21-diacetate and 16,17-acetonide.

The compounds of this invention exhibit various useful physiological activities such as anabolic, androgenic, lipid shifting, antiinflammatory, mineral excreting, gonadotropin inhibition, antiprogestational, antiestrogenic, ovulation inhibiting and contragestive activities and are therefore useful as medicinals or as the materials or intermediates for medicinals.

For instance, 1α,2α-epoxymethano-A-nor-5α-androstan-17β-ol and its 17α-methylated derivative showed strong contragestive activity when tested on mice. They further showed mineral excreting activity and gonadotropin inhibition effect on rats. Thus, they are useful as medicinals or materials for medicine.

The compounds of this invention may be administered enterally or parenterally in dosages of 1 μg.–100 mg./kg. per day for warm blooded animals, including man.

Further, the present process is important to prove the structure of the 1-hydroxy-2-hydroxymethyl group of A-nor-steroids where rare four membered ring oxetane compounds are formed with great ease when the groups are in cis-relationship, conforming to a strict proof of the structure.

Thus the object of the present invention is to provide novel compounds of the steroid series. Another object is to provide a production method thereof. Another object is to utilize the novel reaction in steroid chemistry. Another object is to provide pharmacologically useful novel steroid derivatives. Other objects will be apparent from the present disclosure.

Some of the practical embodiments are shown for the purpose of close explanation of the present process in detail, without intending to limit the invention.

EXAMPLE 1

A suspension of 2β-p-toluenesulfonyloxymethyl-A-nor 5β,25D-spirostan-1β-ol (5.6 parts by weight) in a mixture of potassium hydroxide (5.0 parts by weight) in a mixture of potassium hydroxide (5.0 parts by weight), methanol (120 parts by volume) and water (10 parts by volume) is stirred for 1 hour at room temperature and distilled to remove methanol, and the resultant residue is diluted with water and then extracted with ether. The extract is washed with dilute hydrochloric acid, aqueous saturated sodium carbonate solution and water in order, dried over anhydrous sodium sulfate and evaporated to give crude product (4.3 parts by weight). Crystallization from acetone affords scaly crystals of 1β,2β-epoxymethano-A-nor-5β,25D-spirostane (2.3 parts by weight); M.P. 186.5–187.5° C.

According to the same procedure, 2β-p-toluenesulfonyloxymethyl-A-nor-5β,25D-spirostan-1β-ol acetate, propionate, formate, ethoxycarbonate, benzoate and chloroacetate each affords the same product 1β,2β-epoxymethano-A-nor-5β,25D-spirostane.

According to the similar procedure, 2β-methanesulfonyloxymethyl-A-nor-5β,25D-spirostan-1β-ol, its acetate, ethoxycarbonate and formate each affords the same product 1β,2β-epoxymethano-A-nor-5β,25D-spirostane.

In a similar manner, and substituting the reagent potassium hydroxide by an equivalent amount of sodium hydroxide, potassium carbonate, sodium carbonate, potassium hydrogen carbonate sodium hydrogen carbonate or calcium hydroxide, 2β-methanesulfonyloxymethyl-, 2β-benzenesulfonyloxymethyl- or 2β - p - toluenesulfonyloxymethyl - A - nor-5β,25D-spirostan-1β-ol affords the same product 1β,2β-epoxymethano-A-nor-5β,25D-spirostane.

EXAMPLE 2

A suspension of 2β-chloromethyl-A-nor-5β,25D-spirostan-1β-ol acetate (2.4 parts by weight) in a mixture of potassium hydroxide (2.5 parts by weight), water (10 parts by volume) and methanol (120 parts by volume) is stirred for 1 hour at room temperature. The reaction mixture is diluted with water, neutralized with dilute hydrochloric acid, and extracted with ether. The extract is washed with water, dried and evaporated to give crude product (1.8 parts by weight). Recrystallization from acetone affords 1β,2β-epoxymethano - A - nor-5β,25D-spirostane (M.P. 186.5–187.5° C., 1.5 parts by weight).

According to the same procedure, 2β-chloromethyl-A-nor-5β,25D-spirostan-1β-ol, its formate, ethoxycarbonate and benzoate each affords the same product 1β,2β-epoxymethano-A-nor-5β,25D-spirostane.

In a similar manner, 2β-bromomethyl- and 2β-iodomethyl-A-nor-5β,25D-spirostan-1β-ol or their acetate, formate, methoxycarbonate, chloroacetate, benzoate and p-nitro-benzoate each affords the same product 1β,2β-epoxymethano-A-nor-5β,25D-spirostane.

EXAMPLE 3

A solution of 2α-p-toluenesulfonyloxymethyl-17α-methyl-A-nor-5α-androstane-1α,17β-diol (9.0 parts by weight) in a mixture of methanol (250 parts by volume), water (20 parts by volume) and potassium hydroxide (10 parts by weight) is kept at room temperature for 2.5 hours. The reaction mixture is evaporated under reduced pressure and the resultant residue is diluted with water and extracted with ether. The extract is washed with water, dried over anhydrous sodium sulfate and evaporated to afford crude product (6.3 parts by weight). Recrystallization from a mixture of dichloromethane-hexane gives colorless needles of 17α-methyl-1α,2α-epoxymethano-A-nor-5α-androstan-17β-ol (4.2 parts by weight); M.P. 182–183° C.

EXAMPLE 4

A solution of 2α - p - toluenesulfonyloxymethyl-1β-hydroxy-A-nor-5β-pregn-16-en-20-one. (1.0 part by weight) in a mixture of methanol (10 parts by volume), water (5 parts by volume) and sodium hydroxide (1 part by weight) is kept at room temperature for 2.5 hours. The reaction mixture is evaporated under reduced pressure and the resultant residue is diluted with water and extracted with ether. The extract is washed with water, dried over anhydrous sodium sulfate and evaporated to afford crude product (0.5 part by weight). Recrystallization from a mixture of dichloromethane and hexane gives 1β,2β-epoxymethano-A-nor-5β-pregn-16-en-20-one.

In a similar manner, 2β-p-toluenesulfonyloxymethyl-1β-hydroxy-A-nor-5β-cholanic acid and 2α-toluenesulfonyloxymethyl-A-nor-5α-cholestan-1α-ol affords 1β,2β-epoxymethano - A - nor-5β-cholanic acid and 1α,2α-epoxymethano-A-nor-5α-cholestane respectively.

EXAMPLE 5

1α,2α-epoxymethano-A-nor-5α-estran-17β-ol is prepared from 10.42 g. of 2α-p-toluenesulfonyloxymethyl-A-nor-5α-estrane-1α,17β-diol, 20 ml. of ethanol, 10 ml. of water and 1 g. of sodium hydroxide, according to the manipulative procedure described above in Example 3.

EXAMPLE 6

1α,2α-epoxymethano-A-nor-5α-androstan-17β-ol is prepared from 1.31 g. of 2α-p-toluenesulfonyloxymethyl-A-nor-5α-androstane-1α,17β-diol, 20 ml. of methanol, 2 ml. of water and 1.5 g. of potassium hydroxide according to the manipulative procedure described above in Example 3.

EXAMPLE 7

17,17-ethylenedioxy-1β,2β-epoxymethano - A - nor-5β-androstane is prepared from 1.05 g. of 2β-p-toluenesulfonyloxymethy l- 1β - hydroxy - 17,17 - ethylenedioxy-A-nor-5β-androstane, 20 ml. of methanol, 2 ml. of water and 1.0 g. of potassium hydroxide according to the manipulative procedure described above in Example 3.

EXAMPLE 8

A solution of 0.5 g. of 2α-p-toluenesulfonyloxymethyl-9α-fluoro-A-nor-5α-androstane-1α,11β,17β-triol in a mixture of 20 ml. of methanol, 10 ml. of water and 1.0 g. of potassium carbonate is refluxed for 10 hours. The reaction mixture is filtered to remove solid material and the filtrate is evaporated to dryness. The residue is dissolved in methylene chloride and washed successively with diluted hydrochloric acid and water, dried over anhydrous sodium sulfate and evaporated. The residue is purified by preparative thin-layer chromatography and recrystallization to afford 9α-fluoro-1α,2α-epoxymethano - A - nor-5α-androstane-11β,17β-diol.

EXAMPLE 9

7α-methyl-17α-ethynyl-1α,2α-epoxymethano - A - nor-5α-androstan-17β-ol is prepared from 0.5 g. of 2α-methanesulfonyloxymethyl-7α-methyl-17α-ethynyl - A - nor-5α-androstane-1α,17β-diol, 10 ml. of ethanol, 10 ml. of water and 1.0 g. of potassium carbonate according to the manipulative procedure described above in Example 8.

EXAMPLE 10

17α-acetyloxy-1α,2α-epoxymethano - A - nor - 5α-pregnan-20-one is prepared from 10.37 g. of 2α-benzenesulfonyloxymethyl-1α-hydroxy-17α-acetyloxy - A - nor - 5α-pregnan-20-one, 100 ml. of methanol, 50 ml. of water and 1.0 g. of potassium carbonate according to the manipulative procedure described above in Example 8.

EXAMPLE 11

A solution of 2.0 g. of 17,20;20,21-bismethylenedioxy-A-nor-5β-pregnane-1β,11α-diol in 20 ml. of methanol and 10 ml. of water containing 2 g. of potassium hydroxide is kept at room temperature for 4 hours. The reaction mixture is evaporated under reduced pressure and the resultant residue is diluted with water, dried over anhydrous sodium sulfate and evaporated to afford crude product. Recrystallization of the crude product from acetone and ether gives 17,20;20,21-bismethylenedioxy - 1β,2β - epoxymethano-A-nor-5β-pregnan-11α-ol.

In a similar manner, 2α-p-toluenesulfonyloxymethyl-1α,16α,17α-21-tetrahydroxy - A - nor-5α-pregnane-11,20-dione 16,17-acetonide affords 16α,17α,21-trihydroxy-1α,2α - epoxymethano - A - nor - 5α - pregnane-11,20-dione 16,17-acetonide.

What is claimed is:
1. An A-norsteroid oxetane compound of the formula

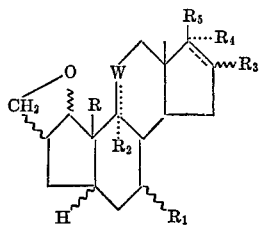

wherein R is methyl, $R_1$ is hydrogen or methyl, $R_2$ is hydrogen or fluorine, $R_3$ is hydrogen, methyl or an R'O— group, $R_4$ is hydrogen, fluorine, methyl, ethyl, ethynyl, alkoxy having up to 7 carbon atoms, or an R'O— group, $R_5$ is fluorine, alkoxy having up to 7 carbon atoms, or an R'O— group, or combined with $R_4$ represents oxo, in which R' is hydrogen, hydrocarbon carboxylic acyl having up to 8 carbon atoms or alkoxy-carboxylic acyl having up to 8 carbon atoms, W is $CH_2$, CHOH or CO and the configurations at $C_1$, $C_2$ and $C_5$ are the same.

2. An A-norsteroid oxetane compound as claimed in claim 1 and selected from the group consisting of 1α (or β), 2α (or β)-epoxymethano-A-nor-5α (or β)-androstan-17β-ol and their lower hydrocarbon carboxylic and lower alkoxycarboxylic acylates.

3. An A-norsteroid oxetane compound as claimed in claim 1, namely 1α,2α-epoxymethano-A-nor-5α-androstan-17β-ol.

4. An A-norsteroid oxetane compound as claimed in claim 1, namely 1β,2β-epoxymethano-A-nor-5β-androstan-17β-ol.

5. An A-norsteroid oxetane compound as claimed in claim 1 and selected from the group consisting of 17α-methyl or ethyl-1α (or β), 2α- (or β) -epoxymethano-5α (or β) -androstan-17β-ol and their lower hydrocarbon carboxylic and lower alkoxycarboxylic acylates.

6. An A-norsteroid oxetane compound as claimed in claim 1, namely 17α-methyl-1α,2α-epoxymethano-A-nor-5α-androstan-17β-ol.

7. An A-norsteroid oxetane compound as claimed in claim 1, namely 17α-methyl-1β,2β-epoxymethano-A-nor-5β-androstan-17β-ol.

8. An A-norsteroid oxetane compound as claimed in claim 1, namely 17α-ethyl-1α,2α-epoxymethano-A-nor-5α-androstan-17β-ol.

9. An A-norsteroid oxetane compound as claimed in claim 1 and selected from the group consisting of 17α-ethynyl-1α (or β), 2α (or β) -epoxymethano-A-nor-5α (or β) -androstan-17β-ol and their lower hydrocarbon carboxylic and lower alkoxycarboxylic acylates.

10. An A-norsteroid oxetane compound as claimed in claim 1, namely 17α-ethynyl-1α,2α-epoxymethano-A-nor-5α-androstan-17β-ol.

11. An A-norsteroid oxetane compound as claimed in claim 1, namely 17α-ethynyl-1β,2β-epoxymethano-A-nor-5β-androstan-17β-ol.

References Cited
UNITED STATES PATENTS 3,120,515   2/1964   Christiansen _____ 260—239.5

OTHER REFERENCES

Djerass: "Steroid Reactions," 1963, p. 340.

ALEX MAZEL, Primary Examiner

J. H. TURNIPSEED, Assistant Examiner

U.S. Cl. X.R.

260—338, 340.5, 340.7, 340.9, 345.9, 488 B, 586 H, 410.9; 424—278